(12) United States Patent
Chen et al.

(10) Patent No.: US 6,444,747 B1
(45) Date of Patent: Sep. 3, 2002

(54) WATER SOLUBLE COPOLYMERS

(75) Inventors: Fu Chen; Natalie A. Kolson, both of West Chester, PA (US)

(73) Assignee: BetzDearborn Inc., Trevose, PA (US)

( * ) Notice: Subject to any disclaimer, the term of this patent is extended or adjusted under 35 U.S.C. 154(b) by 0 days.

(21) Appl. No.: 09/808,679

(22) Filed: Mar. 15, 2001

(51) Int. Cl.[7] .......................... C08L 41/00; C08L 43/00; C08F 220/04; C08F 220/64; C08F 228/02
(52) U.S. Cl. .................... 524/807; 524/817; 524/832; 526/287; 526/318.41; 526/320
(58) Field of Search ............................... 524/817, 807, 524/832; 526/318.41, 320, 287

(56) References Cited

U.S. PATENT DOCUMENTS

| | | | |
|---|---|---|---|
| 3,875,202 | A | 4/1975 | Steckler |
| 4,471,100 | A | 9/1984 | Tsubakimoto et al. |
| 4,659,480 | A | 4/1987 | Chen et al. |
| 4,659,481 | A | 4/1987 | Chen et al. |
| 4,717,499 | A | 1/1988 | Chen |
| 4,732,698 | A | 3/1988 | Chen |
| 4,759,851 | A | 7/1988 | Chen |
| 4,872,995 | A | 10/1989 | Chen et al. |
| 4,895,663 | A | 1/1990 | Chen |
| 4,913,822 | A | 4/1990 | Chen et al. |
| 5,180,498 | A | 1/1993 | Chen et al. |
| 5,292,379 | A | 3/1994 | Reichgott et al. |
| 5,362,324 | A | 11/1994 | Cerulli et al. |
| 5,391,238 | A | 2/1995 | Reichgott et al. |
| 5,575,920 | A | 11/1996 | Freese et al. |
| 5,661,206 | A | 8/1997 | Tanaka et al. |
| 5,705,665 | A | 1/1998 | Ichinohe et al. |
| 5,726,267 | A | * 3/1998 | Howland et al. |

FOREIGN PATENT DOCUMENTS

| | | |
|---|---|---|
| EP | 448717 | 10/1991 |
| JP | 2102152 | 4/1990 |
| JP | 2206757 | 8/1990 |

* cited by examiner

Primary Examiner—Tae H. Yoon
(74) Attorney, Agent, or Firm—Steven D. Boyd

(57) ABSTRACT

A water soluble or water dispersible polymer composition is disclosed. The polymer has the repeat units characterized by the formula I:

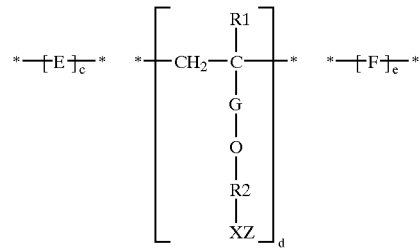

Wherein E is the repeat unit remaining after polymerization of an ethylenically unsaturated compound; preferably, a carboxylic acid, sulfonic acid, phosphonic acid, or amide form thereof or mixtures thereof. $R_1$ is H or lower ($C_1$–$C_4$) alkyl. G is —$CH_2$— or —$CHCH_3$—; $R_2$ is –($CH_2$—$CH_2$—O–$)_n$ or –($CH_2$—$CHCH_3$—O–$)_n$ where n ranges from about 1 to 100, preferably about 1 to 20. X is an anionic radical selected from the group consisting of $SO_3$, $PO_3$, or COO; Z is H or hydrogens or any water soluble cationic moiety which counterbalances the valence of the anionic radical X, including but not limited to Na, K, Ca, or $NH_4$. F, when present, is a repeat unit having the structure of formula II:

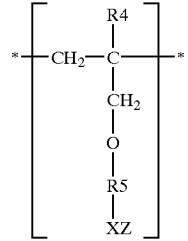

wherein X and Z are the same as in Formula I. $R_4$ is H or lower ($C_1$–$C_4$) alkyl. $R_5$ is hydroxy substituted alkyl or alkylene having from about 1 to 6 carbon atoms.

16 Claims, No Drawings

WATER SOLUBLE COPOLYMERS

FIELD OF THE INVENTION

The present invention relates to novel polymeric compositions which are useful as deposit control and corrosion inhibition agents in water treatment, pulp and paper manufacturing processes, and in pretreating of metals; as rheology modifiers for concrete and cement additives; as cleaning agents for membranes; and as hydrophilic modifier components in personal care, cosmetic and pharmaceutical formulations. These novel compositions comprise water-soluble or water dispersible copolymers of ethylenically unsaturated monomers with sulfate, phosphate, phosphite or carboxylic terminated polyalkylene oxide allyl ethers.

RELATED ART

U.S. Pat. No. 4,471,100, to Tsubakimoto et al discloses a copolymer consisting of maleic acid and polyalkyleneglycol monoallyl ether repeat units useful as a dispersant for cement and paint and as a scale inhibitor for calcium carbonate.

U.S. Pat. Nos. 5,180,498; 5,292,379; and 5,391,238 to Chen et. al., disclose copolymers of acrylic acid and polyethyleneglycol allyl ether for boiler water treatment and metal pretreating applications.

U.S. Pat. No. 5,362,324 describes terpolymers of (meth)acrylic acid and polyethyleneglycol-monomethylether-(meth)acrylate and polypropyleneglycol di(meth)acrylate for superplasticizer applications. U.S. Pat. No. 5,661,206 and EP448717 disclose similar technology but using diepoxy based compounds as crosslinking agents. Japanese Patents 93660, 226757, and 212152 disclose acrylic acid terpolymers with sodium methallylsulfonate and methoxy polyethylene glycol-monomethacrylate for superplasticizer applications.

U.S. Pat. No. 5,575,920 to Freese et al. discloses terpolymers of acrylic acid, allyloxy-2-hydroxypropylsulfonic acid (AHPSE) and polyethyleneglycol allyl ether for cooling water treatment as calcium phosphate inhibitors.

U.S. Pat. No. 3,875,202 to Steckler discloses polymerizable ammonium and alkali metal salts of sulfated monoethylenically unsaturated alcohols of from 3 to 12 carbon atoms and of the alkenoxylated adducts of such alcohols. The polymerizable monomers are useful as co-polymerizable surfactants for self-stabilizing latexes and as comonomers in the copolymerization with other monomers in the preparation of co- or ter-polymeric films and fibers, especially as receptors for basic dyes and to build in anti-static properties. Monomers such as vinyl chloride, ethyl acrylate, 2-ethylhexyl acrylate, vinyl acetate and N-methylol acrylamide are disclosed in the patent to be copolymerizeable with the ammonium salt of sulfated monoethylenically unsaturated alcohols. The copolymers disclosed are not water-soluble.

U.S. Pat. No. 5,705,665 to Ichinohe et. al. relates to organic silicon compounds having as one of the components ethoxlated allyl alcohol with alkali metal salt of sulfonate group in the molecule. The resulting compound is useful as a surface treating agent and modifier for inorganic material. The copolymers disclosed are not water-soluble or dispersible.

DETAILED DESCRIPTION OF THE INVENTION

The present invention pertains to the composition of novel water-soluble or water dispersible polymers, which contain pendant functional groups. The novel polymers of the present invention are copolymers or terpolymers having the structure of Formula I.

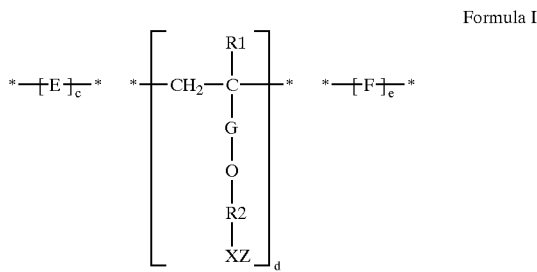

Formula I

Wherein E is the repeat unit remaining after polymerization of an ethylenically unsaturated compound; preferably, a carboxylic acid, sulfonic acid, phosphonic acid, or amide form thereof or mixtures thereof. $R_1$ is H or lower ($C_1$–$C_4$) alkyl. G is —$CH_2$— or —$CHCH_3$—; $R_2$ is –($CH_2$—$CH_2$—O$)_n$ or –($CH_2$—$CHCH_3$—O$)_n$ where n ranges from about 1 to 100, preferably about 1 to 20.

X is an anionic radical selected from the group consisting of $SO_3$, $PO_3$, or COO; Z is H or hydrogens or any water soluble cationic moiety which counterbalances the valence of the anionic radical X, including but not limited to Na, K, Ca, or $NH_4$. F, when present, is a repeat unit having the structure of Formula II

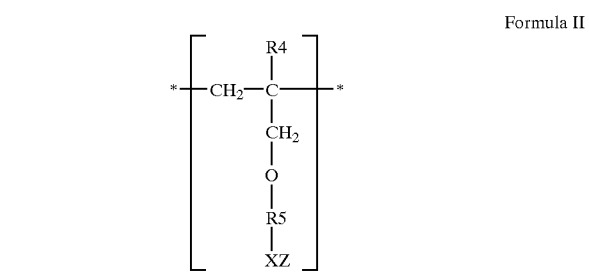

Formula II

In Formula II, X and Z are the same as in Formula I. $R_4$ is H or lower ($C_1$–$C_4$) alkyl. $R_5$ is hydroxy substituted alkyl or alkylene having from about 1 to 6 carbon atoms.

With respect to E of Formula 1, it may comprise the repeat unit obtained after polymerization of a carboxylic acid, sulfonic acid, phosphonic acid, or amide form thereof or mixtures thereof. Exemplary compounds include but are not limited to the repeat unit remaining after polymerization of acrylic acid, methacrylic acid, acrylamide, methacrylamide, N-methyl acrylamide, N,N-dimethyl acrylamide, N-isopropylacrylamide, maleic acid or anhydride, fumaric acid, itaconic acid, styrene sulfonic acid, vinyl sulfonic acid, isopropenyl phosphonic acid, vinyl phosphonic acid, vinylidene di-phosphonic acid, 2-acrylamido-2-methylpropane sulfonic acid and the like and mixtures thereof. Water-soluble salt forms of these acids are also within the purview of the present invention. More than one type of monomer unit E may be present in the polymer of the present invention.

Subscripts c, d, and e in Formula I are the molar ratio of the monomer repeating unit. The ratio is not critical to the present invention providing that the resulting copolymer is water-soluble or water-dispersible. Subscripts c and d are positive integers while subscript e is a non-negative integer. That is, c and d are integers of 1 or more while e can be 0, 1, 2 . . . etc.

A preferred copolymer of the present invention, that is where e=0, is acrylic acid/polyethyleneglycol monoallyl ether sulfate of the structure.

Formula III

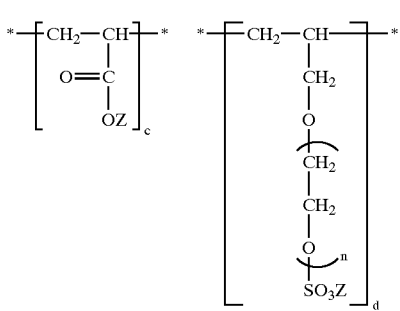

Wherein n ranges from about 1 to 100, preferably about 1 to 20. Z is hydrogen or a water soluble cation such as Na, K, Ca or $NH_4$.

Molar ratio c:d ranges from 30:1 to 1:20. Preferably, the molar ratio of c:d ranges from about 15:1 to 1:10. The ratio of c to d is not critical to the present invention providing that the resulting polymer is water-soluble or water-dispersible.

A preferred terpolymer of the present invention, that is where e is a positive integer, is acrylic acid/polyethyleneglycol monoallyl ether sulfate/1-allyloxy-2-hydroxypropylsulfonic acid of the structure.

Formula IV

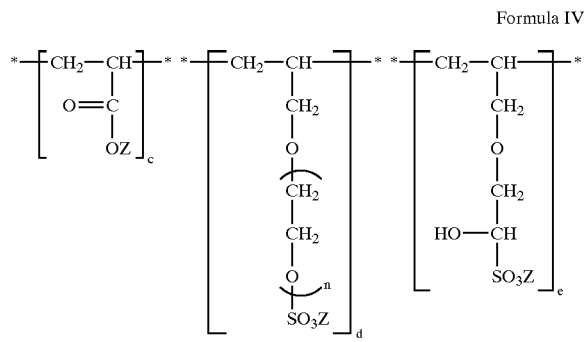

Wherein n ranges from about 1–100, preferably about 1–20. Z is hydrogen or a water soluble cation such as, Na, K, Ca or $NH_4$. Z may be the same or different in c, d and e. The mole ratio of c:d:e is not critical so long as the terpolymer is water-soluble or water-dispersible. Preferably the mole ratio c:d:e ranges from about 20:10:1 to 1:1:20.

The polymerization of the copolymer and/or terpolymer of the present invention may proceed in accordance with solution, emulsion, micelle or dispersion polymerization techniques. Conventional polymerization initiators such as persulfates, peroxides, and azo type initiators may be used. Polymerization may also be initiated by radiation or ultraviolet mechanisms. Chain transfer agents such as alcohols, preferably isopropanol or allyl alcohol, amines or mercapto compounds may be used to regulate the molecular weight of the polymer. Branching agents such as methylene bisacrylamide, or polyethylene glycol diacrylate and other multifunctional crosslinking agents may be added. The resulting polymer may be isolated by precipitation or other well-known techniques. If polymerization is in an aqueous solution, the polymer may simply be used in the aqueous solution form.

The molecular weight of the water-soluble copolymer of Formula I is not critical but preferably falls within the range Mw of about 1,000 to 1,000,000. More preferably from about 1,000 to 50,000 and most preferably from about 1,500 to 25,000. The essential criteria is that the polymer be water-soluble or water-dispersible.

Use of the Polymers

The polymers of the invention are effective for water treatment in cooling water, boiler and steam generating systems as deposit control and/or corrosion inhibition agents. The appropriate treatment concentration will vary depending upon the particular system for which treatment is desired and will be influenced by factors such as the area subjected to corrosion, pH, temperature, water quantity and the respective concentrations in the water of the potential scale and deposit forming species. For the most part, the polymers of the present invention will be effective when used at levels of from about 0.1–500 parts per million parts of water, and preferably from 1 about to 100 parts per million of water contained in the aqueous system to be treated. The polymers may be added directly into the desired water system in an aqueous solution, continuously or intermittently.

The polymers of the present invention are not limited to use in any specific category of water system. For instance, in addition to boiler and cooling water systems, the polymers may also be effectively utilized in scrubber systems and the like wherein corrosion and/or the formation and deposition of scale forming salts is a problem. Other possible environments in which the polymers of the present invention may be used include heat distribution type seawater desalting apparatus and dust collection systems in iron and steel manufacturing industries. The polymers of the present invention are also efficacious as deposit and pitch control agents in the paper and pulp manufacturing processes for preventing deposit of pitch, calcium oxalate and barium sulfate. They can also be used as viscosity and rheology modifiers in mining and mineral processing applications to reduce the viscosity of slurries.

The water-soluble or dispersible polymers of the present invention may be used in combination with topping agents in order to enhance the corrosion inhibition and scale controlling properties thereof. For instance, the polymers of the present invention may be used in combination with one or more compounds selected from the group consisting of inorganic phosphoric acids, phosphonic acid salts, organic phosphoric acid esters, and polyvalent metal salts or mixtures thereof. Such topping agents may be added to the system being treated in an amount of from about 1 to 500 ppm.

Examples of inorganic phosphoric acids include condensed phosphoric acids and water-soluble salts thereof. Examples of phosphoric acids include orthophosphoric acids, primary phosphoric acids and secondary phosphoric acids. Examples of inorganic condensed phosphoric acids include polyphosphoric acids such as pyrophosphoric acid, tripolyphosphoric acid and the like, metaphosphoric acids such as trimetaphosphoric acid, and tetrametaphosphoric acid.

Examples of other phosphoric acid derivatives, which can be combined with the polymers of the present invention include aminopolyphosphonic acids such as aminotrimethylene phosphonic acid, ethylene diaminetetramethylene phosphonic acid and the like, methylene diphosphonic acid, hydroxyethylidene diphosphonic acid, 2-phosphonobutane 1,2,4, tricarboxylic acid, etc.

Exemplary organic phosphoric acid esters which may be combined with the polymers of the present invention include phosphoric acid esters of alkyl alcohols such as methyl phosphoric acid ester, ethyl phosphoric acid ester, etc., phosphoric acid esters of methyl cellosolve and ethyl cellosolve, and phosphoric acid esters of polyoxyalkylated polyhydroxy compounds obtained by adding ethylene oxide to polyhydroxy compounds such as glycerol, mannitol, sorbitol, etc. Other suitable organic phosphoric esters are the phosphoric acid esters of amino alcohols such as mono, di, and tri-ethanol amines. The water-soluble polymers may also be used in conjunction with molybdates such as, sodium molybdate, potassium molybdate, lithium molybdate, ammonium molybdate, etc.

The polymers of the present invention may be used in combination with yet other topping agents including corrosion inhibitors for iron, steel, copper, and copper alloys or other metals, conventional scale and contamination inhibitors, metal ion sequestering agents, and other conventional water treating agents. Examples of other corrosion inhibitors include tungstate, nitrites, borates, silicates, oxycarboxylic acids, amino acids, catechols, aliphatic amino surface active agents, benzotriazole, halogenated triazoles and mercaptobenzothiazole. Other scale and contamination inhibitors include lignin derivatives, tannic acids, starches, polyacrylic acids and their copolymers including but not limited to acrylic acid/2-acrylamido-2-methylpropanesulfonic acid copolymers and acrylic acid/allyloxy-2-hydroxypropane-3-sulfonic acid copolymers, maleic acids and their copolymers, polyepoxysuccinic acids and polyacrylamides, etc. Examples of metal ion sequestering agents include polyamines, such as ethylene diamine, diethylene triamine and the like and polyamino carboxylic acids, such as nitrilo triacetic acid, ethylene diamine tetraacetic acid, and diethylenetriamine pentaacetic acid.

U.S. Pat. Nos. 4,659,481; 4,717,499; 4,759,851; 4,913,822; and 4,872,995 disclose the use of specific copolymers in treating cooling, boiler, steam generating and other aqueous heat transfer systems to inhibit deposition of scales such as calcium phosphate, calcium phosphonate, calcium oxalate, iron oxide, zinc oxide and silica. Based upon the deposit control efficacy exhibited by the polymers of the present invention, it is believed that they could be substituted for the polymers disclosed in the above and other similar patents to provide improved performance in a wide variety of water based treatment applications.

The polymers of the present invention are also effective in conversion coatings for the pretreating of aluminum, steel and other metallic surfaces to provide corrosion resistance, improve adhesion of coatings and for aesthetic reasons. The conversion coatings improve the adhesion of coating layers such as paints, inks, lacquers and plastic coatings. The polymers of the present invention can be used alone or in combination with an acid selected from the group of acetic acid, glycolic acid, dihydrohexafluorotitanic acid, dihydrohexafluorozirconic acid, dihydrohexafluorosilic acid, and fluoroboric acid. Homopolymers or copolymers of acrylic acid, maleic acids, itaconic acid and acrylamide may also be used in combination with the copolymers of the present invention in chromate free conversion coatings.

The copolymers of the present invention can be used alone or in combination with conventional cleaning agents such as surfactants, chelating agents, citric acid, phosphoric acid and other common reagents to remove deposit and prevent fouling on membranes used in the micro filtration, ultra filtration and reverse osmosis applications.

The copolymers of the present invention can also be used as superplasticizers or retarders with cementitious materials in the construction industry applications. In addition, the polymers of the present invention are useful as viscosity modifier to reduce the slurry viscosity in the mining and mineral processing and oil field operations.

The present invention will now be further described with reference to a number of specific examples which are to be regarded solely as illustrative and not as restricting the scope of the present invention.

EXAMPLES

Example 1

Preparation of Acrylic Acid/Ammonium Allylpolyethoxy (10) Sulfate Copolymer A suitable reaction flask was equipped with a mechanical agitator, a thermometer, a reflux condenser, a nitrogen inlet and two addition inlets for the initiator and monomer solutions. The flask was charged with 73.5 g of deionized water and 58.5 g (0.1 mol) of ammonium allyl polyethoxy (10) sulfate. While sparging with nitrogen, the solution was heated to 85° C. An initiator solution containing 2.2 g. of 2,2'-azobis(2-amidinopropane)hydrochloride (Wako V-50, from Wako Chemical Company) was sparged with nitrogen for ten minutes. The initiator solution and 21.6 g. (0.3 mol) of acrylic acid were added gradually to the reaction flask over a two-hour period. Following the addition, the solution was heated to 95° C. and held for 90 minutes. The reaction was then cooled to lower than 40° C. and 50% caustic solution was added until the pH measured 8–9.

The structure of the resulting copolymer was verified by Carbon 13 NMR. The polymer solution was diluted to 30% solids and had a Brookfield viscosity of 48.6 cps at 25° C.

Example 2

Preparation of Acrylic Acid/Ammonium Allylpolyethoxy (10) Sulfate Copolymer Utilizing the procedure and apparatus similar to the prior example, 147 g of deionized water and 61.9 g (0.11 mol) of ammonium allyl polyethoxy(10) sulfate (DVP-010, from Bimax Inc.) were charged to the reaction flask. The solution was heated to 85° C. An initiator solution containing sodium persulfate 1.9 g in water was sparged with nitrogen for ten minutes. The initiator solution and 22.9 g (0.32 mol) of acrylic acid were gradually added to the reaction flask over a two-hour period. Following the addition, the solution was heated to 95° C. and held for 90 minutes. The reaction was cooled to lower than 40° C. and 50% caustic solution was added until the pH measured 4–5.

The structure of the resulting copolymer was verified by Carbon 13 NMR. The polymer solution was diluted to 30% solids and had a Brookfield viscosity of 13.0 cps at 25° C.

Example 3

Preparation of Acrylic Acid/Ammonium Allylpolyethoxy (10) Sulfate/Allyloxy-2-hydroxypropane-3-sulfonic Acid Terpolymer Utilizing the procedure and apparatus similar to Example 1, 84.7 g of deionized water, 21.8 g (0.1 mol) of allyloxy-2-hydroxypropane-3-sulfonic acid and 58.5 g (0.1 mol) of the ammonium allyl polyethoxy-(10)-sulfate monomer were charged to the reaction flask. While sparging with nitrogen, the solution was heated to 85° C. An initiator solution of 2,2'-azobis(2-amidinopropane)hydrochloride and 21.6 g (0.3 mol) of acrylic acid were added to the reaction flask over a 3.5 hour period. Following the addition, the solution was heated to 95° C. and held for two hours. The reaction was cooled and a 50% caustic solution was added for pH adjustment.

The structure of the resulting copolymer was verified by Carbon 13 NMR. The polymer solution was diluted to 30% solids and had a Brookfield viscosity of 27.2 cps at 25° C.

Example 4

Preparation of Acrylic Acid Methacrylic Acid/ Ammonium Allylpolyethoxy (10) Sulfate Terpolymer Utilizing the procedure and apparatus similar to Example 1, 109.7 g of deionized water, 20.6 g of isopropyl alcohol and 58.5 g (0.1 mol) of ammonium allyl polyethoxy-(10)-sulfate monomer mixture were charged to the reaction flask. While sparging with nitrogen, the solution was heated to 85° C. A solution of sodium persulfate and 21.6 g (0.3 mol) of acrylic acid and 8.6 g (0.1 mol) of methacrylic acid were added separately to the reaction flask over a two-hour period. Following the addition, the solution was heated to 95° C. and held for two hours. After the reaction, isopropyl alcohol was removed from the solution before cooled down and pH adjustment.

The structure of the resulting copolymer was verified by Carbon 13 NMR. The polymer solution was diluted to 25% solids and had a Brookfield viscosity of 21.0 cps at 25° C.

Example 5

Preparation of Acrylic Acid/2-Acrylamido-2-methylpropanesulfonic Acid/Ammonium Allylpolyethoxy (10) Sulfate Terpolymer Utilizing the procedure and apparatus similar to Example 4, 127.9 g of deionized water, 20.5 g of isopropyl alcohol and 58.5 g (0.1 mol) of ammonium allyl polyethoxy-(10)-sulfate monomer were charged to the reaction flask. While sparging with nitrogen, the solution was heated to 85° C. Sodium persulfate solution and a solution containing 21.6 g (0.3 mol) of acrylic acid and 20.7 g (0.1 mol) of 2-acrylamido-2-methylpropane sulfonic acid (AMPS$^R$, from Lubrizol Inc.) were added separately to the reaction flask over a two-hour period. Following the addition, the solution was heated to 95° C. and held for two hours before cooled down and pH adjustment.

The structure of the resulting copolymer was verified by Carbon 13 NMR. The polymer solution was diluted to 25% solids and had a Brookfield viscosity of 17.0 cps at 25° C.

Example 6

Preparation of Allylpolyethoxy (10) Phosphate

A suitable reaction flask was equipped with a mechanical agitator, a thermometer, and a reflux condenser. 20 g of hydroxypolyethoxy-(10)-allyl ether (0.04 mol., AA-E10, from Bimax Inc.) were charged to the reactor. 6.16 g. of phosphorous oxychloride (0.04 mol) was added dropwisely to the reactor. The mixture was stirred vigorously for one hour followed by heating to 50° C. and holding for 4.5 hours. After cooling to ambient temperature, the reaction was quenched by slow addition to water. The pH was adjusted to 4 with caustic solution. C 13 NMR analysis indicated the presence of phosphate ester.

Example 7

Preparation of Acrylic Acid/Allylpolyethoxy (10) Phosphate Copolymer

Utilizing the procedure and apparatus similar to Example 1, 41.3 g of deionized water and 60.3 g (0.05 mol) of 49.8% allylpolyethoxy (10) phosphate from Example 6 were charged to the reaction flask. While sparging with nitrogen, the solution was heated to 85° C. A solution of 2,2'-azobis (2-amidinopropane)hydrochloride (1.07 g) and 10.7 g (0.147 mol) of acrylic acid were added gradually to the reaction flask over a two-hour period. Following the addition, the solution was heated to 95° C. and held for 90 minutes before cooled down and pH adjustment.

The structure of the resulting copolymer was verified by Carbon 13 NMR. The polymer solution was diluted to 25% solids and had a Brookfield viscosity of 221.0 cps at 25° C.

Example 8

Preparation of Acrylic Acid/Allylpolyethoxy (10) Sulfate Copolymer

Utilizing the procedure and apparatus similar to Example 1, 58.6 g of deionized water, 58.6 g (0.1 mol) of allylpolyethoxy (10) sulfate, and 0.8 g of allyl alcohol were charged to the reaction flask. While sparging with nitrogen, the solution was heated to 85° C. A solution of sodium persulfate (1.92 g) in 6.0 g of water and 21.6 g (0.147 mol) of acrylic acid were added gradually to the reaction flask over a two-hour period. Following the addition, the solution was heated to 95° C. and held for 90 minutes before cooled down and pH adjustment.

The structure of the resulting copolymer was verified by Carbon 13 NMR. The polymer solution was diluted to 25% solids and had a Brookfield viscosity of 65.0 cps at 25° C.

Table 1 summarizes the composition and physical properties of the copolymers prepared in accordance to the procedure described above. In Table 1, Examples 1–8 were prepared in accordance with the above correspondingly numbered descriptions. Example 9 was prepared in accordance with the description above for Examples 3–5 with a modified comonomer molar ratio. Examples 10–15 were prepared in accordance with the descriptions of Examples 1 and 2 with modified comonomer molar ratios and molecular weights. The molecular weights were obtained by a Size Exclusion Chromatography analysis using polyacrylic acid as standards.

TABLE I

| Example | Polymer Composition Comonomer Molar Ratio | % Solids | Brookfiled Viscosity #1 S @60 rpm | pH | Molecular Weight (Mw) |
|---|---|---|---|---|---|
| 1 | AA/APES (3/1) | 29.70 | 48.6 | 9.8 | 18,420 |
| 2 | AA/APES (3/1) | 29.23 | 13.0 | 4.2 | 30,670 |
| 3 | AA/AHPS/APES (3/1/1) | 30.10 | 27.2 | 8.3 | 13,100 |
| 4 | AA/MAA/APES (3/1/1) | 25.20 | 21.0 | 5.7 | 19,600 |

TABLE I-continued

| Example | Polymer Composition Comonomer Molar Ratio | % Solids | Brookfiled Viscosity #1 S @60 rpm | pH | Molecular Weight (Mw) |
|---|---|---|---|---|---|
| 5 | AA/AMPS/APES (3/1/1) | 25.10 | 17.0 | 5.8 | 17,800 |
| 6 | AA/AAE-10 phosphate (3:1) | 25.7 | 221.0 | 6.5 | |
| 7 | MAA/APES (6:1) | 30.75 | 44.3 | 8.3 | 11,490 |
| 8 | AA/APES (3:1:) | 25.7 | 65.0 | 7.4 | 72,100 |
| 9 | AA/ARPS/APES (6/1/1) | 30.47 | 30.5 | 9.4 | 15,790 |
| 10 | AA/APES (3/1) | 25.10 | 19.0 | 6.1 | 15,300 |
| 11 | AA/APES (3/1) | 24.8 | 13.0 | 5.9 | 10,100 |
| 12 | AA/APES (3/1) | 29.46 | 19.6 | 5.9 | 5,910 |
| 13 | AA/APES (4/1) | 25.16 | 15.0 | 4.1 | 43,700 |
| 14 | AA/APES (6/1) | 27.15 | 42.4 | 4.1 | 138,090 |
| 15 | AA/APES (6/1) | 30.13 | 15.2 | 4.1 | 5,250 |

AA = acrylic acid
MAA = methacrylic acid
APES = ammonium allylpolyethoxy(10) sulphate, containing 10 moles of ethylene oxide, DVP-010, from Bimax Inc.
AHPS = 1-allyloxy-2-hydroxypropyl-3-sulfonic acid, from BetzDearborn
AA E10 Phosphate = polyethyleneglycol (10 moles of ethylene oxide) allyl ether phosphate
AMPS ® = 2-acrylamido-2-methylpropanesulfonic acid, from Lubrizol Inc.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

What is claimed is:

1. A composition comprising a water-soluble or water dispersible polymer of the formula:

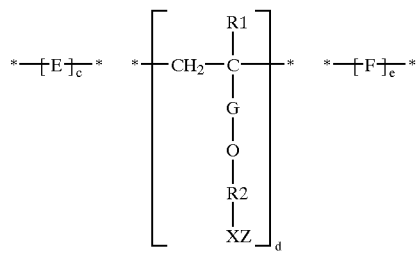

wherein E is the repeat unit remaining after polymerization of an ethylenically unsaturated compound; R1 is H or lower ($C_1$–$C_4$) alkyl; G is —$CH_2$— or —$CHCH_3$—; R2 is –($CH_2$—$CH_2$—O–)$_n$ or –)$CH_2$—$CHCH_3$—O–)$_n$; wherein n ranges from about 1 to 100; X is $SO_3$, $PO_3$ or COO; Z is H or a water soluble cationic moiety; F is a repeat unit of the formula:

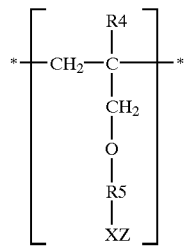

wherein R4 is H or lower ($C_1$–$C_4$) alkyl, R5 is hydroxy substituted alkyl or alkylene having from 1 to 6 carbon atoms; and c, d and e are positive integers.

2. The composition of claim 1, wherein said ethylenically unsaturated compound is one or more of: carboxylic acid, sulfonic acid, phosphonic acid or amide form thereof or mixtures thereof.

3. The polymer of claim 2, wherein said ethylenically unsaturated compound is one or more of: acrylic acid, methacrylic acid, acrylamide, methacrylamide, N-methyl acrylamide, N,N-dimethyl acrylamide, N-isopropyl acrylamide, maleic acid or anhydride, fumaric acid, itaconic acid, styrene sulfonic acid, vinyl sulfonic acid, isopropenyl phosphonic acid, vinyl phosphonic acid, vinylidene diphosphonic acid, 2-acrylamido-2-methylpropane sulfonic acid or mixtures thereof.

4. The composition of claim 1, wherein said water soluble cationic moiety is selected from the group consisting of Na, K, Ca and $NH_4$.

5. The composition of claim 1, wherein the molecular weight Mw ranges from 1,000–1,000,000.

6. The composition of claim 1, wherein the molecular weight Mw ranges from about 1,000 to about 50,000.

7. The composition of claim 1, wherein the molecular weight Mw ranges from about 1,500 to 25,000.

8. The composition of claim 1, wherein the ratio c:d:e ranges from about 20:10:1 to 1:1:20.

9. The composition of claim 1, wherein n ranges from about 1 to 20.

10. A composition comprising a water-soluble or water dispersible polymer of the formula

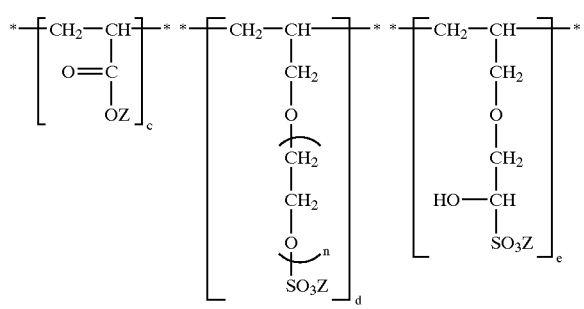

wherein n ranges from about 1–100; Z is hydrogen or a water soluble cation; and c, d and e are positive integers.

11. The composition of claim 10, wherein said water soluble cation is selected from the group consisting of Na, K, Ca $NH_4$ and mixtures thereof.

12. The composition of claim 10, wherein the ration c:d:e ranges from about 20:10:1 to about 1:1:20.

13. The composition of claim 10, wherein the molecular weight Mw ranges from about 1,000 to 1,000,000.

14. The composition of claim 10, wherein the molecular weight Mw ranges from about 1,000 to 50,000.

15. The composition of claim 10, wherein the molecular weight Mw ranges from about 1,000 to 25,000.

16. The composition of claim 10, wherein n ranges from about 1 to 20.

* * * * *